United States Patent Office 3,153,710
Patented Oct. 20, 1964

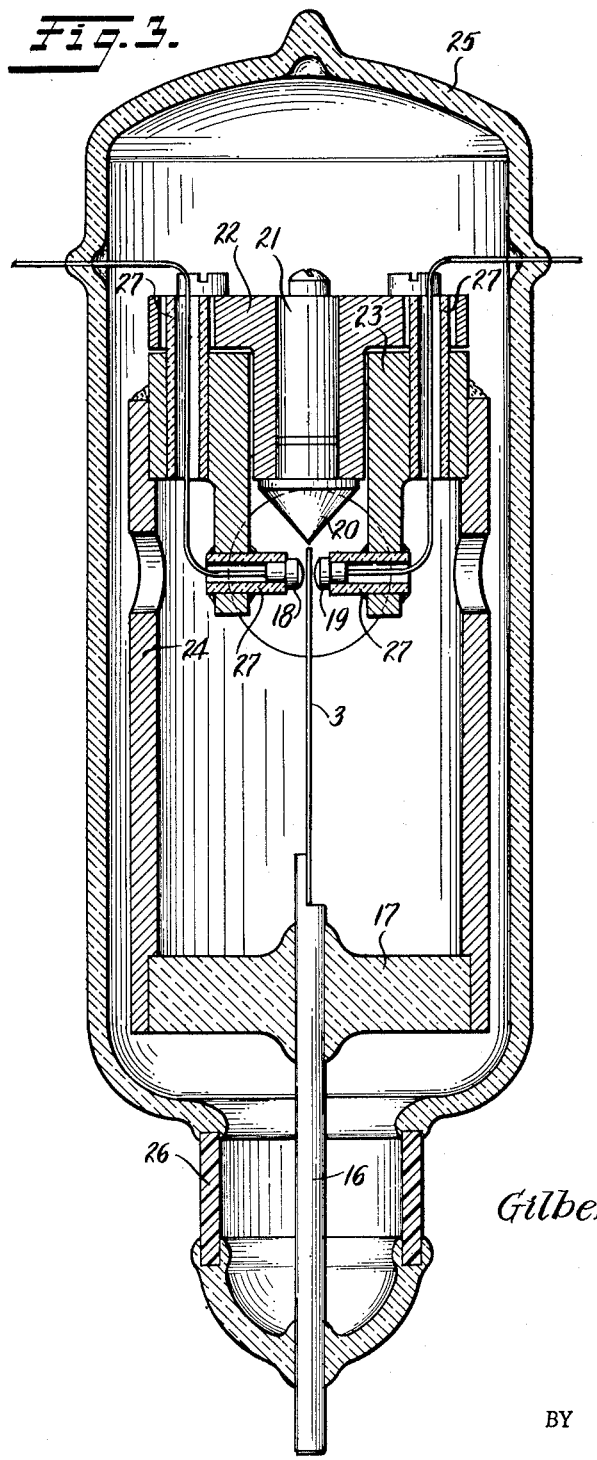

3,153,710
ELECTROSTATIC RELAY FOR MEASURING
SMALL CURRENTS AND CHARGES
Gilbert Ganouna-Cohen, 144 Ave. Aristide Briand,
Bagneux (Seine), France; Michel Dieval, 48 Ave. de
Stalingrad, Antony (Seine), France; Claude Renaut, La
Residence d'Orsay, Orsay (Seine et Oise), France; Henri
Rigaut, 81 Rue Lamarck, Paris 18 (Seine), France; and
Jean Savouyaud, 30 Ave. Saint-Laurent, Orsay (Seine et
Oise), France
Filed Dec. 6, 1960, Ser. No. 74,161
Claims priority, application France, Dec. 23, 1959,
813,979
11 Claims. (Cl. 200—87)

The measuring of small continuous or variable electric charges and currents coming from high impedance sources is always delicate, by reason of the apparatus required.

Among the apparatus most generally used at present are included:

(a) The wire or leaf electrometer—this apparatus, is precise but fragile, and consequently is a laboratory apparatus and cannot be used for industrial measuring;

(b) The D.C. amplifier—this apparatus necessitates the use of an impedance adaptor consisting of an electrometer tube having an accurately chosen grid-leak resistance; these two members do not have constant characteristics because they age, giving rise to a lack of accuracy in measurement. Furthermore, these amplifiers must be switched on a long time before measurement is taken in order to achieve stable working conditions;

(c) The vibrating condenser electrometer followed by an A.C. amplifier—this apparatus has fewer of the derivation faults which are inherent in D.C. amplifiers, but it is extremely delicate to manufacture, in particular as regards the plates of the condenser between which parasitic voltages, due to the potential differences of the contacts, can arise.

All these apparatus are expensive and of considerable bulk.

In order to measure small currents and charges, devices which transform low value currents or charges into a bigger electric charge can be used, thus allowing the duration or the frequency of this charge then to be measured with high accuracy, this duration or this frequency being proportional to the intensity of the weak current or to the value of the small charge to be measured, to this end a condenser such as will be described later can be used.

The present invention has for an object an electrostatic relay for measuring small currents and charges which eliminates the drawbacks of devices previously known for this purpose by replacing the mensuration of the effect produced by a current by mensuration of the time required to accumulate a charge of determined value.

To this end, according to the invention, an electrostatic relay having a movable electrode and at least one fixed electrode, is provided with means for producing a magnetic field and co-operating with one end of the movable electrode in order to hold or return the latter in an inoperative position, the said movable electrode being, for this purpose, at least partly made of ferro-magnetic material.

In order that the invention may be more clearly understood, reference will now be made to the accompanying drawings which show firstly a known type of condenser usable for measuring charges, and secondly, schematic and somewhat diagrammatic views of an electrostatic relay according to the invention by way of example, and in which:

FIGURE 1 shows a diagrammatic view of the known condenser for measuring charges and having one fixed and one movable plate, FIGURE 2 shows a diagrammatic representation of the relay according to the invention, and FIGURE 3 shows somewhat diagrammatically, a practical embodiment of the relay of FIGURE 2.

Referring to the drawings, FIGURE 1 shows a known type of condenser for use in measuring charges, having a fixed plate 1 in the shape of a truncated cone, the base of which is small and has an area of a few square millimetres, mounted on a support 2 of insulating material. Facing this plate, and above it, is positioned a movable plate 3 consisting of a metallic leaf whose thickness is of the order of 20 microns attached to a metal angle-bracket by means of a screw 5, screwing into the support 2, and by a washer 6. This angle-bracket 4 itself is fixed to the support 2 by a screw 7. The possible displacement of this angle-bracket 4 by means of the screw 5 and a return spring 8, allows the distance of the movable plate 3 from the fixed plate 1 to be adjusted.

Above the plate 3 is located an adjustable contact 9 fixed to the support 2 by a member 10; this contact 9, in the absence of a weak current to be measured, is regulated so that it does not touch the movable plate 3.

The weak current to be measured is passed through the condenser progressively to charge it, the current conductors (not shown) being connected to the fixed and movable plates. When this charge is sufficient, the movable plate 3 is drawn towards the fixed plate 1. At the moment of contact of these two plates the condenser discharges itself into an electric circuit; it is obvious that the greater the current to be measured, the higher is the discharge frequency of the condenser: the mensuration of this frequency gives very closely the intensity of the current to be measured. The manufacture of the movable plate condenser shown presents particular problems due to the difficulty of obtaining contacts which are free and without appreciable wear of the electrodes and these problems are substantially solved by the present invention.

According to the invention, the relay schematically shown in FIGURE 2 is provided with a magnet 11; the movable plate 3 is secured in a pole-piece 12, the other pole-piece 13 serving solely to focus the lines of force of the magnet. A useful magnetic flow passing in the air gap 14 can be varied by acting upon a threaded rod 15 serving as magnetic shunt. This device allows a very flexible regulation to be obtained.

FIGURE 3 shows a practical embodiment of relay of the invention, but still somewhat diagrammatically, in which the movable electrode is also shown at 3 which constitutes a capacitor element, fixed on a rod 16 which can advantageously be made of a material, such as that known under the registered trademark Kovar, and integral with a glass support 17. The position of the movable electrode is fixed between two fixed electrodes 18 and 19 by a magnetic field concentrated at the point of a pole-piece 20 integral with a magnet 21 screwed to a support 22.

In the specific embodiment shown, the elements 18 and 19 constitute not only fixed capacitor elements but also serve as contacts to complete a circuit upon deflection of the movable capacitor element 3 into contact therewith. Obviously the circuit completing contacts could be separate elements from the fixed capacitor elements but the arrangement disclosed has been found to be satisfactory and is less complicated and less expensive than it would be were separate contacts employed.

The position of the support 22 is adjustable and this allows the alteration of the size of the gap between the pole-piece 20 and the leaf or electrode 3, and the fixing of the position of this latter at the required distance between the electrodes 18 and 19.

The electrodes 18 and 19 are held by a support 23, itself integral with a tube 24 of brass or other suitable material, fixed on the glass support 17. The entire device is located in a glass bulb 25 enclosing an inert or reducing atmosphere or which is evacuated. The glass wall of the bulb 25 is interrupted adjacent the rod 16 by a tube 26 made of Kovar, for instance, constituting a protective ring.

Two members 27 respectively holding the electrodes 18 and 19 are calibrated or marked with a scale and are made from an insulating material, such as glass.

The embodiment shown is particularly characterised by a regulatable sensitivity and also by the elimination of bouncing of the movable electrode on the fixed contact electrode. Such bouncing actions are harmful because they cut off the supply or cause short-circuiting. The elimination of these bouncing actions leads to an accuracy of more than 1% and to a contact life of more than $10^8$ impulses.

The above described embodiments lend themselves to uses in the most varied fields. Among others can be cited:

The detection of impulses caused by radio activity.

The actuation of an alarm when an impulse exceeds a determined amplitude.

The actuation of the alarm when the mean frequency of the impulses reaches a determined value.

The measuring of ionisation currents.

The measuring of a resistance (this mensuration is related to that of the time which separates two impulses and can equally well be effected by one of the three methods, embodiments of which have been described above).

The precision reached is 1 in 1,000 with resistances to be measured whose value is between $10^{17}$ and $10^{18}$ ohms. Apart from this, one can, with the device according to the invention, detect quantities of electricity which do not exceed $10^{-11}$ coulomb.

We claim:

1. An electrostatic relay comprising: an elongated capacitor element, at least a portion of which is of ferromagnetic material, a fixed capacitor element laterally of but adjacent and spaced to one side from said elongated capacitor element; said elongated element being supported at one end for lateral movement of the other end toward and from said fixed element, a portion of said fixed capacitor element defining a fixed contact adjacent a portion of one side of said elongated element and engageable thereby upon lateral movement of said elongated element toward said fixed element; and permanent magnet means positioned in fixed longitudinal alignment with the movable end of said elongated element and oriented to establish a magnetic field extending longitudinally of said elongated element whereby to return said elongated element to a predetermined position, spaced from said fixed contact and from said fixed capacitor element, upon movement of said fixed element in either direction from said predetermined position.

2. A relay as defined in claim 1 having a second fixed contact on the other side of said elongated element; said magnet being so positioned that said predetermined position is between and spaced from both said fixed contacts.

3. A relay as defined in claim 2 in which said elongated element comprises a strip of resilient material fixed at said one end.

4. A relay as defined in claim 1 wherein said magnet means includes a pole piece adjacent the free end of said strip and aligned with the longitudinal axis thereof.

5. A relay as defined in claim 4 wherein said pole piece is provided with a pointed end directed toward the free end of said strip.

6. A relay as defined in claim 4 wherein said pole piece is adjustably mounted for movement laterally of said elongated element whereby said predetermined position may be regulated.

7. A relay as defined in claim 1 in which said named parts are housed in a hermetically sealed housing.

8. A relay as defined in claim 7 wherein said housing is of glass.

9. A relay as defined in claim 7 wherein said housing contains an inert gas.

10. A relay as defined in claim 7 wherein said housing contains a reducing gas.

11. A relay as defined in claim 7 wherein said housing is evacuated of substantially all gas.

References Cited in the file of this patent

UNITED STATES PATENTS

| | | |
|---|---|---|
| 1,558,277 | Phelan et al. | Oct. 20, 1925 |
| 2,175,354 | Lewin | Oct. 10, 1939 |
| 2,277,215 | Ellwood | Mar. 24, 1942 |
| 2,471,594 | Weightman | May 31, 1949 |
| 2,547,026 | Winkler | Apr. 3, 1951 |
| 2,920,250 | Thomas et al. | Jan. 5, 1960 |
| 2,957,061 | Domeier | Oct. 18, 1960 |
| 2,966,567 | Ovshinsky | Dec. 27, 1960 |
| 3,002,067 | Baldwin et al. | Sept. 26, 1961 |
| 3,029,326 | Fischer | Apr. 10, 1962 |
| 3,046,370 | Adams et al. | July 24, 1962 |